C. P. BOSSERT.
PIGMENT STIRRING PAN.
APPLICATION FILED MAY 16, 1921.
1,417,885.
Patented May 30, 1922.
2 SHEETS—SHEET 1.
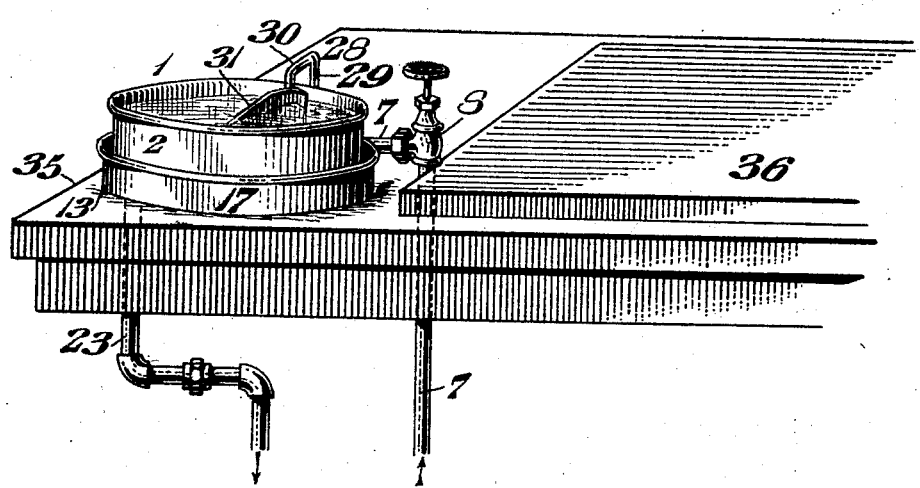
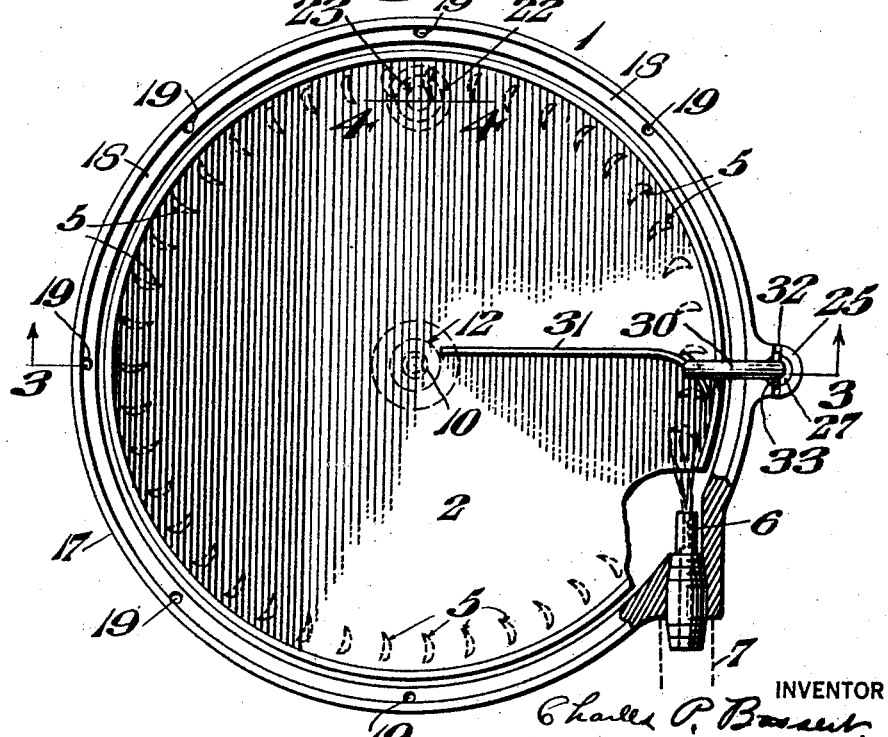
INVENTOR
Charles P. Bossert,
BY
Wiedersheim Fairbanks
ATTORNEYS

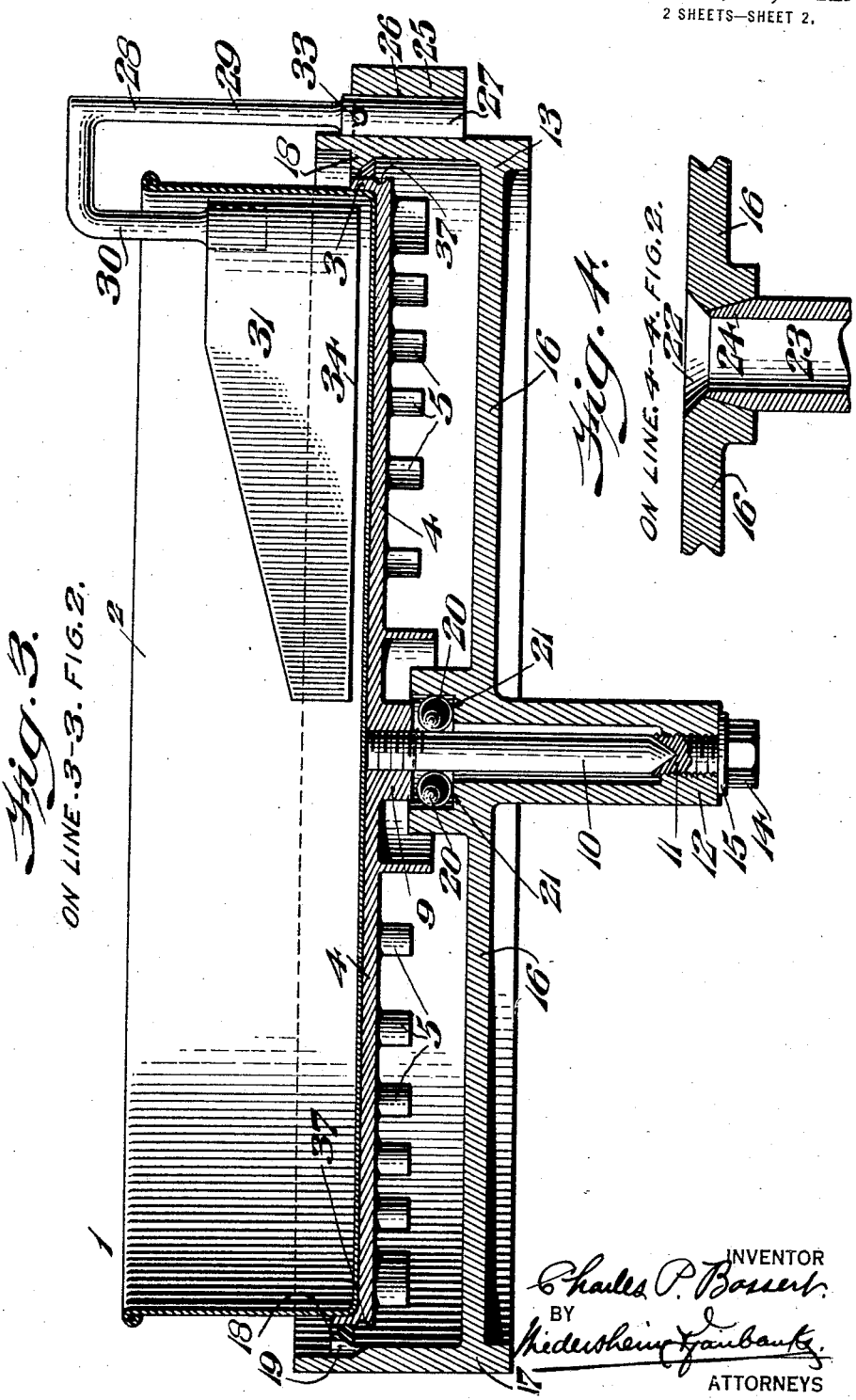

UNITED STATES PATENT OFFICE.

CHARLES P. BOSSERT, OF MILWAUKEE, WISCONSIN, ASSIGNOR TO PFISTER & VOGEL LEATHER CO., OF MILWAUKEE, WISCONSIN, A CORPORATION OF WISCONSIN.

PIGMENT-STIRRING PAN.

1,417,885.   Specification of Letters Patent.   Patented May 30, 1922.

Application filed May 16, 1921. Serial No. 470,047.

*To all whom it may concern:*

Be it known that I, CHARLES P. BOSSERT, a citizen of the United States, residing in the city and county of Milwaukee, State of Wisconsin, have invented a new and useful Pigment-Stirring Pan, of which the following is a specification.

In the art of treating or manufacturing leather, there are certain grades or classes of skins, which at certain stages of their manufacture require the application thereto of a suitable pigment, which is applied by hand, and which liquid or pigment is of such a nature that it requires constant stirring or agitation so that the ingredients thereof may be at all times properly commingled.

The object of my present invention is to effect this pigment stirring operation by automatic, mechanical means which require no attention on the part of the operator, my novel device in its entirety being readily supported upon a work bench occupying very little room, and requiring no attention on the part of the operator other than the replenishing of the pan with pigment according to requirements, and the adjustment or manipulation of the valve, which controls the inlet of the motive fluid which rotates the pan of pigment with respect to the stationary stirring device.

To the above ends my invention consists of a novel construction of a pigment stirring pan, comprising an outer casing, a table or support rotatably mounted therein and provided on its bottom surface with an annular series of buckets, which are adapted to receive the impact of the motive fluid, which is introduced tangentially into said casing against said buckets, provision being also made for supporting the pigment stirring blade in relatively stationary position and locking the same from movement with respect to the pigment containing pan and its adjuncts, whereby the pigment will be mechanically and automatically stirred or agitated without any attention on the part of the operator.

To the above ends my invention consists of a novel construction of a pigment stirring pan and its adjuncts, the novel features of which will be hereinafter fully set forth and pointed out in the claims.

For the purpose of illustrating my invention, I have shown in the accompanying drawings a form thereof which is at present preferred by me, since it will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of my novel construction of pigment stirring pan, and its adjuncts.

Figure 2 represents on an enlarged scale, a plan view of the pan and its adjuncts seen in Figure 1, a portion of the outer casing being broken away to show the tangentially disposed nozzle for the incoming motive fluid.

Figure 3 represents on an enlarged scale a vertical section on line 3—3 of Figure 2.

Figure 4 represents on an enlarged scale a section on line 4—4 of Figure 2.

Similar numerals of reference indicate corresponding parts.

1 designates my novel construction of pigment stirring pan, and its adjuncts, the same comprising the pan 2, which is positioned within the vertical flange or lip 3 of the rotary table 4, the bottom of which is provided with the annular row of buckets 5, collocated as will be understood from Figure 2, and positioned in the path of the incoming jet of water or other liquid or fluid introduced or conveyed under pressure to the tangentially arranged nozzle 6, through the inlet pipe 7, which has the control valve 8 therein. The rotary table 4 has a central bottom hub 9, from which depends the vertical stem 10, whose lower end may be pointed and stepped into the hardened bearing 11 which is screwed into the bottom of the tubular extension 12 by the polygonal head 14, which has the flange 15 abutting against the bottom of said extension. The casing 13 is composed of the base portion 16 and the vertical outer annular wall of flange 17, at the inner upper portion of which is located the inwardly projecting annular ledge 18, which is provided with the holes 19, said ledge preventing the motive fluid from splashing upwardly. The vertical stem 10 is guided by any suitable ball bearing device 20, contained in the seat 21, it being understood that any conventional type of ball bearing may be employed, to take up the side thrust.

22 designates a port in the base 16 of the casing 13, which is preferably counterbored, as will be understood from Figure 4, below which port is positioned the exhaust or outlet pipe 23, the upper end 24 of the latter being preferably tapered, as will be understood from Figure 4.

25 designates a lug on the side of the casing 13 having a vertical hole 26 therethrough, in which is seated the head 27 of the arm or bracket 28, which is composed of the members 29 and 30, the latter having secured thereto the blade or stirrer 31, whose bottom edge 34 is raised a short distance from the bottom of the pan 2. The top of the lug 25 has the transverse seat 32 therein, see Figure 2, which receives the ends of the transverse pin 33, which passes through the bottom head 27, as will be understood from the right of Figure 2, wherefrom it will be seen that the arm 28 and the stirrer or blade 31 are readily dropped into position and are held relatively stationary to the rotary pan 2, and rotary table 4. The casing 13 may be of cast iron and the rotary table 4 of cast iron and bracket 28 of brass.

In Figure 1, I have shown my novel device as ready for use upon the bench 35, and in proximity to the work slab 36.

37 designates an annular groove in the outer periphery of the rotary table 4.

The operation is as follows:—

The pan 2 is filled to the desired extent with the pigment or other liquid and the stirrer or blade 31 assembled with respect thereto, so that the parts appear as best seen in Figure 2. The operator then opens the valve 8 and the water or other liquid or fluid under pressure enters the nozzle 6, (see Figure 2) and impinges or impacts upon the buckets 5 whereupon the table 4 and the pan 2 revolve in unison, the speed of rotation being controlled by the manipulation of said valve. The blade 31 being relatively stationary effects the desired stirring of the pigment or other liquid, and the exhaust liquid escapes through the outlet pipe 23. By the provision of the ball bearings 20 and the stepped bearing 11, friction is reduced to a minimum and any dripping or splashing from the pigment containing pan 2, can flow through the ports 19 to the bottom 16 of the casing 13.

It will be understood that the weight of the pan and its contents and adjuncts is supported on the pointed end of the stem 10 resting on the step bearing 11, there being a slight clearance between the bottom of the hub 9 and the ball bearing 20.

It will now be apparent that I have devised a novel and useful pigment stirring pan which embodies the features of advantage enumerated as desirable in the statement of the invention and the above description, and while I have, in the present instance shown and described a preferred embodiment thereof which will give in practice satisfactory and reliable results it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a device of the character stated, an outer casing having an inlet for the motive fluid, a rotary table mounted in said casing and having buckets annularly arranged on the bottom thereof and adapted to receive the impact of the incoming fluid through said inlet, a pigment containing pan open at its top and supported on said table and a stationary blade located within said pan and mounted upon said casing.

2. In a device of the character stated, an outer casing having an inlet nozzle for the motive fluid, a rotary table mounted in said casing and having buckets annularly arranged on the bottom thereof and adapted to receive the impact of the incoming fluid through said nozzle, an upwardly extending outer annular flange on said table, a pigment pan open at its top and positioned within said flange, an annular inwardly projecting ledge on said casing located in proximity to said flange and a stirrer located within said pan and held relatively stationary with respect thereto.

3. In a pigment stirring pan, an outer casing, having an inlet nozzle, a rotary table mounted in said casing and having buckets annularly arranged on the bottom thereof, and adapted to receive the impact of the incoming fluid through said inlet, ball bearings common to the bottom of said table and the bottom of said casing, a vertical stem depending from said table and having its lower end stepped into a bearing carried by a depending extension of said casing, and a stirrer positioned within said pan and stationarily supported upon said casing.

4. In a device of the character stated, a pigment stirring pan, means for rotating said pan open at its top, a supporting casing, a bracket mounted in a lug on said casing, a pin extending transversely through said bracket, a recess in the top of said lug adapted to receive the ends of said pin and hold the same stationary and a stirring blade positioned within said pan and carried by said bracket.

5. In a device of the character stated, an outer casing having an inlet for the motive fluid, a valved inlet pipe located in proximity thereto, an outlet pipe leading from said casing for conveying away the exhaust motive fluid, a rotary table mounted in said casing and having buckets on the bottom thereof annularly arranged in line with said inlet, a pan open at its top and carried by said table, a central hub on said table, ball bearings therefor, a vertical stem depending from said hub and having its lower end stepped into a bearing carried by said casing, a bracket non-rotatably mounted on said casing, and a stirring blade positioned within said pan and carried by said bracket.

6. In a device of the character stated, an outer casing having an inlet for the motive fluid, a valved inlet pipe located in proximity thereto, an outlet pipe leading from said casing for conveying away the exhaust motive fluid, a rotary table mounted in said casing and having buckets thereon arranged in line with said inlet, a pan carried by said table, a central hub on said table, ball bearings therefor, a vertical stem depending from said hub and having its lower end stepped into a bearing carried by said casing, a bracket non-rotatably mounted on said casing, and a stirring blade positioned within said pan and carried by said bracket, in combination with an annular, inwardly projecting ledge on said casing located in proximity to said rotary table.

7. In a device of the character stated, an outer casing having an inlet for the motive fluid, a table rotatably mounted in said casing, there being a chamber formed between the bottom of said table and the bottom of said casing, buckets annularly arranged on the bottom of said table and adapted to receive the impact of the incoming motive fluid from said inlet, a pigment containing pan supported on said table, a stirrer supported in fixed position within said pan, and an annular inwardly deflected flange on said casing for preventing splashing of the motive fluid.

CHARLES P. BOSSERT.

Witnessed by—
FRED W. GRUENWALD,
FRED SCHWARZE.